US008266091B1

(12) United States Patent
Gubin et al.

(10) Patent No.: US 8,266,091 B1
(45) Date of Patent: Sep. 11, 2012

(54) SYSTEMS AND METHODS FOR EMULATING THE BEHAVIOR OF A USER IN A COMPUTER-HUMAN INTERACTION ENVIRONMENT

(75) Inventors: Maxim Gubin, Walnut Creek, CA (US); Keith Newstadt, Newton, MA (US)

(73) Assignee: Symantec Corporation, Mountain View, CA (US)

( * ) Notice: Subject to any disclaimer, the term of this patent is extended or adjusted under 35 U.S.C. 154(b) by 685 days.

(21) Appl. No.: 12/506,962

(22) Filed: Jul. 21, 2009

(51) Int. Cl.
*G06F 9/44* (2006.01)
*G06N 7/02* (2006.01)
*G06N 7/06* (2006.01)

(52) U.S. Cl. ........................................................ 706/52
(58) Field of Classification Search .................... None
See application file for complete search history.

(56) References Cited

U.S. PATENT DOCUMENTS

2007/0044010 A1* 2/2007 Sull et al. ................... 715/500.1
2010/0332330 A1* 12/2010 Goel et al. ................. 705/14.66

OTHER PUBLICATIONS

Guo et al. "Efficient Multiple-Click Models in Web Search", WSDM, Feb. 2009, pp. 124-131.*
Creswell et al. "An Experimental Comparison of Click Position-Bias Models", WSDM, 2008, pp. 87-94.*
Migge et al. "User Model for Predictive Calibration Control on Interactive Screens", CW, 2010, pp. 32-37.*
Website: http://www-01.ibm.com/software/awdtools/tester/robot/?S_TACT=105AGX15&S_CMP=LP, *Rational Robot*, Sep. 14, 2009 (2 pgs.).
Website: http.www.routinebot.com/, *RoutineBot—GUI Test Automation Robot*, Sep. 14, 2009 (6 pgs.).

* cited by examiner

*Primary Examiner* — Jeffrey A Gaffin
*Assistant Examiner* — Li-Wu Chang
(74) *Attorney, Agent, or Firm* — Holland & Hart LLP

(57) ABSTRACT

A computer-implemented method for emulating the behavior of a user in a computer-human interaction environment is described. An image of a window and data relating to positions of clicks executed within the image are received. A probabilistic model is created to estimate a probability of a click being executed in a region of a window. Clicks, in accordance with the probabilistic model, are executed within windows associated with a plurality of applications. A clicks distribution model is created based on the position of the clicks executed within the windows of the plurality of applications. Clicks, in accordance with the clicks distribution model, are executed within a window associated with an application being tested.

16 Claims, 8 Drawing Sheets

SYSTEMS AND METHODS FOR EMULATING THE BEHAVIOR OF A USER IN A COMPUTER-HUMAN INTERACTION ENVIRONMENT

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors. The wide-spread use of computers has been accelerated by the increased use of computer networks, including the Internet. Many businesses use one or more computer networks to communicate and share data between the various computers connected to the networks. The productivity and efficiency of employees often requires human and computer interaction.

Computer technologies used by consumers and by the business world continue to demand that the efficiency of these technologies increase. These demands have included demands to improve security software to detect harmful applications that may execute on a computer to erase, steal, or otherwise harm sensitive data stored on a computer. Harmful applications may also use the resources of an infected computer to send spam, participate in attacks against other devices, etc. Demands to increase the efficiency of computer technologies have also included demands to improve efficiencies in developing and testing applications that may be sold to computer users.

The efficiency of malicious applications has also increased. Many modern malicious programs and Internet sites use interactions with a user to complicate (or make impossible) the ability of security software to automatically analyze these applications and sites. As a result, security software is unable to detect whether or not an unknown application or Internet site intends to perform harmful activity to a computer. The security software does not detect harmful activity until after a user has interacted with these types of applications.

In addition, developers of applications may desire to test the usability of a particular application that is being designed. For example, developers may desire to know whether or not user interfaces are intuitive and simple for a user to interact with.

As shown from the above discussion, there is a need for systems and methods to emulate the behavior of a user in a controlled, computer-human interaction environment.

SUMMARY

According to at least one embodiment, a computer-implemented method for emulating the behavior of a user in a computer-human interaction environment is described. An image of a window and data relating to positions of clicks executed within the image may be received. A probabilistic model may be created to estimate a probability of a click being executed in a region of a window. Clicks, in accordance with the probabilistic model, may be executed within windows associated with a plurality of applications. A clicks distribution model may be created based on the position of the clicks executed within the windows of the plurality of applications. Clicks, in accordance with the clicks distribution model, may be executed within a window associated with an application being tested.

In one embodiment, one or more features from the image that are related to human visual perception may be extracted. In one configuration, the extracted features of the image may include contrast zones, textures, contours, or shapes within the image. The one or more extracted features may be combined with the data relating to the positions of the clicks executed within the image to create a probabilistic model.

In one configuration, the one or more windows may be a user interface for an application. A reinforcement learning algorithm may process data collected from the application and the probabilistic model to produce a second probabilistic model. The second probabilistic model may incorporate initial information about images, sequences of clicks, and information regarding the behavior of the application. In one embodiment, the sequence of clicks may maintain the execution of the application for a specified length of time. In another embodiment, the sequence of clicks may cause a predetermined activity from the application. In a further embodiment, the sequence of clicks executed within the window of the application may create a specified file. The application being tested may be a potentially malicious application.

A computer system configured to emulate the behavior of a user in a computer-human interaction environment is also described. The computer system may include a processor and memory in electronic communication with the processor. The computer system may also include an emulating system configured to receive an image of a window and data relating to positions of clicks executed within the image, and create a probabilistic model to estimate a probability of a click being executed in a region of a window. The emulating system may also be configured to execute clicks, in accordance with the probabilistic model, within windows associated with a plurality of applications. In addition, the emulating system may be configured to create a clicks distribution model based on the position of the clicks executed within the windows of the plurality of applications, and execute clicks, in accordance with the clicks distribution model, within a window associated with an application being tested A computer-program product for emulating the behavior of a user in a computer-human interaction environment is also described. The computer-program product may include a computer-readable medium having instructions thereon. The instructions may include code programmed to receive an image of a window and data relating to positions of clicks executed within the image, and code programmed to create a probabilistic model to estimate a probability of a click being executed in a region of a window. The instructions may also include code programmed to execute clicks, in accordance with the probabilistic model, within windows associated with a plurality of applications, and code programmed to create a clicks distribution model based on the position of the clicks executed within the windows of the plurality of applications. In addition, the instructions may include code programmed to execute clicks, in accordance with the clicks distribution model, within a window associated with an application being tested.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
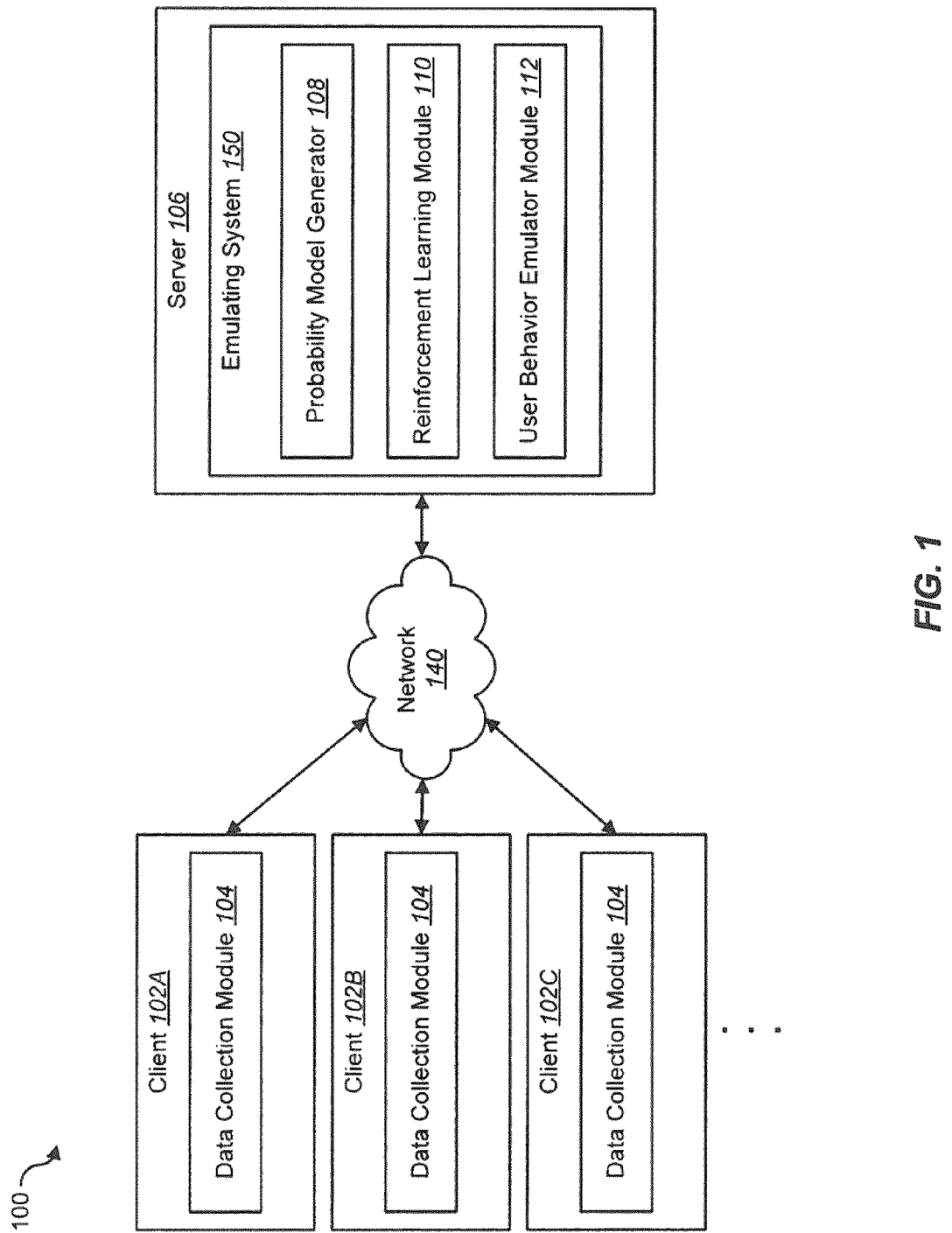
FIG. 1 is a block diagram illustrating one embodiment of a server that may include an emulating system in accordance with the present systems and methods.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Many modern malicious programs and Internet sites use interfaces to interact with a user. These user interfaces may complicate or make impossible an automatic analysis of the programs and sites. A widespread approach of these malicious programs and Internet sites is to emulate a standard user interface that entices the user to execute a mouse click in a particular location (or zone) of the interface. The malicious behavior may only be evident after the click has been executed. These emulated interface are usually simple. For example, an emulated user interface may be a window that includes a standard "OK" and "CANCEL" button. These well-known buttons may trigger an intuitive reaction from the user (i.e., the user may click on either the "OK" button or the "CANCEL" button). Although the emulated user interface may be visually familiar for the user, the internal implementation of the interface may not be standard. As a result, an automatic analysis tool that detects malicious programs or Internet sites may not be able to detect the malicious behavior of the program or site.

In addition, during the design of a user interface for an application, it may be difficult for a programmer to estimate the intuitiveness of the user interface for a potential user. In many cases, usability tests ran on user interfaces for applications that are being developed may not give consistent results because these tests may involve only a small number of potential users. It may be beneficial to know the average reaction of a user that interacts with the user interface. The proposed systems and methods emulate human perception of a program user interface as well as the intuitive reaction of a user towards the user interface.

In one embodiment, the present systems and methods may collect statistics about the behavior of a user from a large set of users. An automatic collection system may collect the statistics. In one embodiment, a statistical model may be built from the collected statistics. The statistical model may be used to emulate the behavior of a user. For example, the buttons on a user interface may be pressed according to the model. The statistical model may be used to perform other operations. In addition, the present systems and methods may use the model to interact with a user interface of a malicious application in order to expose the malicious behavior of the application. In addition, the present systems and methods emulate the average behavior of a user. As a result, the present systems and methods may be used to verify and test a user interface of an application that is in a design phase.

FIG. 1 is a block diagram illustrating one embodiment of a server 106 that may include an emulating system 150 in accordance with the present systems and methods. The server 106 may communicate with a client computing device 102A, 102B, 102C. Examples of the client computing devices 102A, 102B, 102C may include, without limitation, a laptop computer, a personal digital assistant (PDA), an Internet kiosk, a mobile communications device, a gaming device, a desktop computer, or combinations thereof. In one configuration, the server 106 may communicate with the clients 102A, 102B, 102C over a network connection 140. While only three clients 102A, 102B, 102C are illustrated in FIG. 1, the server 106 may communicate with more or less client computing devices over the network 140.

In one configuration, each of the clients 102A, 102B, 102C may include a data collection module 104. The data collection module 104 may be an application that runs in the background on the client computing devices 102A, 102B, 102C. In one embodiment, the data collection module 104 may collect images of windows on the clients 102A, 102B, 102C. In addition, the collection module 104 may collect the positions of user's clicks (such as with a mouse) in the windows. In other words, the collection module 104 captures images of the windows as well as where a user clicks in the windows. While only three clients 102A, 102B, 102C are illustrated with the data collection module 104, the module 104 may be installed on more or less client computing devices. For example, the collection module 104 may be installed on a large group of clients in order to collect data (e.g., window images, positions of clicks within these windows, etc.) relating to the average behavior of a user for different types of applications. For example, the collected data may include images of windows for various types of applications that may run on the clients 102A, 102B, 102C. The collected data may also include the positions of a user's clicks within each of these windows for the various applications.

In one embodiment, the emulating system 150 on the server may use the data collected by the collection module 104 to emulate the behavior of a user on user interfaces of various applications. In one example, the emulating system 150 may include a probability model generator 108. The generator 108 may be program that processes the data collected by the data collection module 104. For example, the generator 108 may extract certain features from the images of windows that have been collected by the collection module 104. The extracted features of the widow images may be relevant to human visual perception. For example, these features may include contrast zones of the window images, different textures of the images, contours and shapes within the images, etc. Any additional features that may be used to emulate human behavior on the user interface of an application under evaluation may also be selected. In one embodiment, the probability model generator 108 may combine the extracted features with the data relating to the position of the user's clicks within the windows. The generator 108 may then create a probabilistic model. In one embodiment, the probabilistic model may estimate the probability a click will occur in a particular zone (or region) of a window. The estimated probability may be based on the features extracted from the window image.

In one embodiment, the probabilistic model may not rely on information concerning the purpose of a user's click in a particular zone of a window image. As a result, the probabilistic model may be used to model the behavior of a user that interacts with a window image for the first time. In one configuration, the probabilistic model may also be used to emulate a user's behavior during an automatic analysis of a simple malicious website. In other words, the probabilistic model may be used to emulate the behavior and actions of a user that may interface with a malicious website.

In one configuration, the emulating system 150 may also include a reinforcement learning module 110. In some embodiments, the probabilistic model generated by the generator 108 may be too biased for complex web pages, application analysis, and usability testing of an application. As a result, the reinforcement learning module 110 may be used to reduce this bias. In one example, the reinforcement learning module 110 may create a model and apply a reinforcement learning algorithm to smooth and reduce the bias of the probabilistic model.

The emulating system 150 may further include a user behavior emulator module 112. In one configuration, the module 112 may use the model produced by the reinforcement learning module 110 to emulate human behavior. In other words, the user behavior emulator module 112 may emulate the behavior of a user towards a malicious software program being analyzed. The module 112 may also emulate the user's behavior towards an application that is being tested. For example, the module 112 may provide an indication about the average response of a user towards a user interface associated with the application under test. This may allow programmers of the application to determine the usability of the application.

Figure 2:
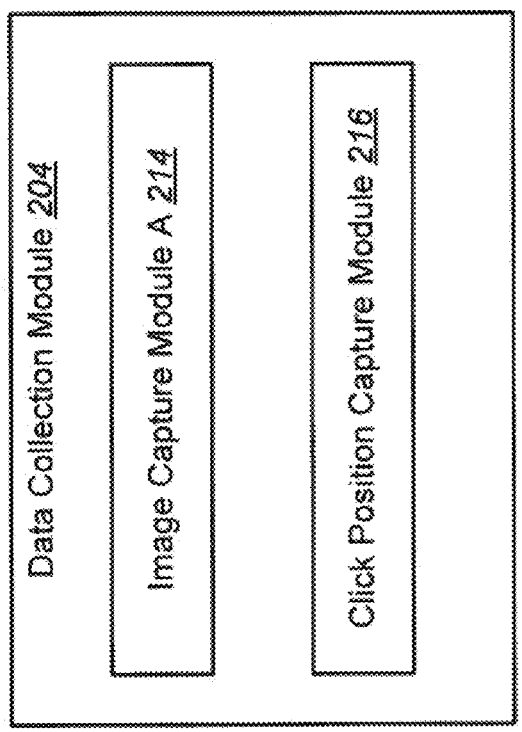
FIG. 2 is a block diagram illustrating a further embodiment of a data collection module.

FIG. 2 is a block diagram illustrating a further embodiment of a data collection module 204. The data collection module 204 may be an application that runs in the background on a client computing device 102. In one configuration, the data collection module 204 may include an image capture module 214 and a click position capture module 216. In one example, the image capture module 214 may collect images of windows. For example, as images of windows appear on a display of the client computing device 102, the image capture module 214 may capture and collect the images of these windows.

In one embodiment, the click position capture module 216 may capture and collect the various positions within the window image that a user's mouse click was executed. In other words, the click position capture module 216 may gather data relating to where a user clicks within an image of a window.

Figure 3:
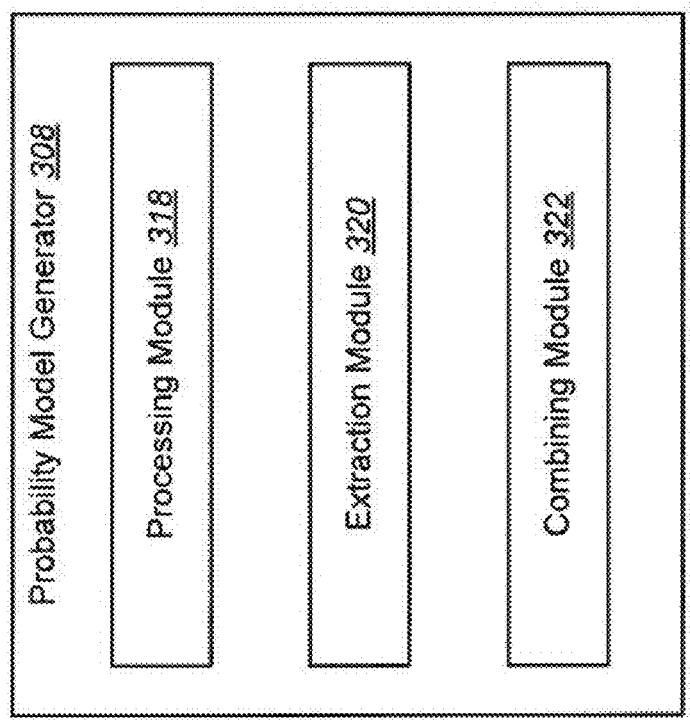
FIG. 3 is a block diagram illustrating a further embodiment of a probability module generator.

FIG. 3 is a block diagram illustrating a further embodiment of a probability module generator 308. In one example, the generator 308 may include a processing module 318, an extraction module 320, and a combining module 322. The processing module 318 may receive and process data that is collected by the data collection module 104. For example, the processing module 318 may receive and process the images of windows that are collected by the data collection module 104 running on various client computing devices 102A, 102B, 102C. In addition, the processing module 318 may process data relating to the position of user's clicks within the collected window images.

In one embodiment, the extraction module 320 may extract certain features from the processed images of windows. As previously explained, the extracted features may be relevant to human visual perception. These features may include contrast zones of the window images, different textures within the window images, contours and shapes within the images, etc. In one configuration, the extraction module 320 may extract any feature from an image of a window that may be relevant to human visual perception.

In one configuration, the combining module 322 may combine the features extracted from the processed images of windows with the data relating to the position of user's clicks within the collected window images. In one example, the probability module generator 308 may create a probabilistic model from the combination of the extracted features and the user click data. The probabilistic model may be used to estimate the probability that a click will be executed in a particular zone (or region) of a window. The estimation may be based on the features of the window. The features used to estimate the probability that a user's click may be executed in a certain region of a window may be related to features previously extracted from processed images of windows. In one embodiment, the probability model may indicate the probability that a user may click in a particular zone or region of a window. The window may be a user interface of an application being tested, a user interface of a potentially malicious program or website, etc. The probability model may also use features extracted from an image of a window to estimate the most probable regions of the window that a user may execute a click.

Figure 4:
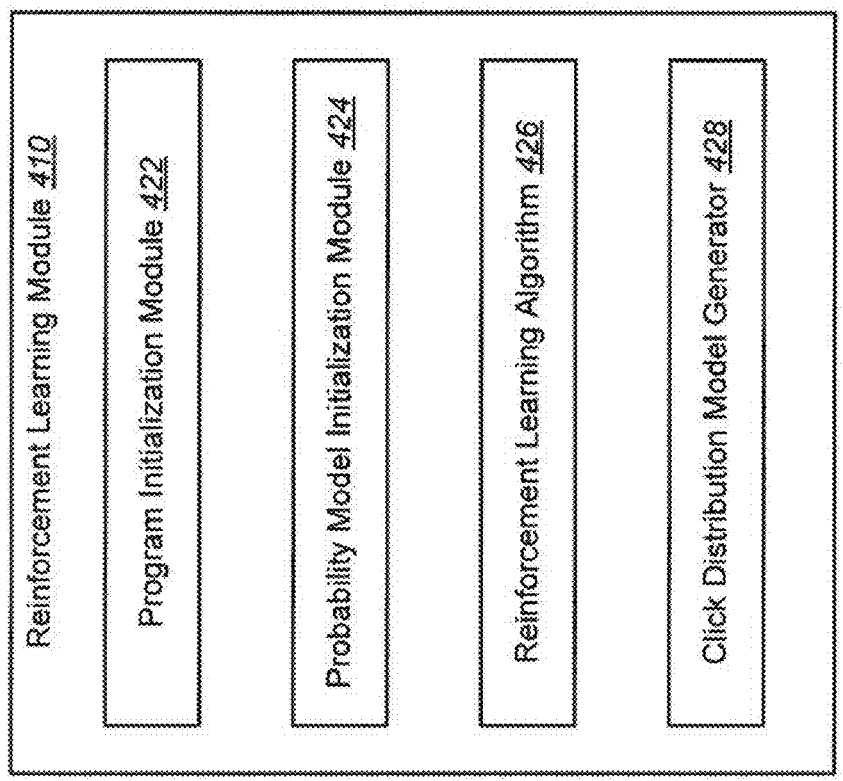
FIG. 4 is a block diagram illustrating a further embodiment of a reinforcement learning module.

FIG. 4 is a block diagram illustrating a further embodiment of a reinforcement learning module 410. In one configuration, the reinforcement learning module 410 may include a program initialization module 422, a probability model initialization module 424, a reinforcement learning algorithm 426, and a click distribution model generator 428.

As previously explained, the probabilistic model generated by the generator 108 may be too biased for complex web pages, application analysis, and usability testing of an application. The reinforcement learning module 410 may be used to reduce this bias. In one embodiment, the program initialization module 422 may initialize a large set of executables that may be similar in design to potential malicious or previously tested applications. The initialization module 422 may run these executables (or programs). The probability model initialization module 424 may then initialize the probability model. The probability model may be used by the reinforcement learning module 410 to click on user interfaces associated with the executables initialized by the program initialization module 422. In one embodiment, clicks may be executed on the user interfaces in accordance with the probability model.

In one configuration, the reinforcement learning module 410 may use the reinforcement learning algorithm 426 to process data collected from the application and the probabilistic model to produce a second probabilistic model. The second probabilistic model may incorporate initial information about images, sequences of clicks, and information regarding the behavior of the application. A particular sequence of click executed on a user interface may result in the longest execution time possible of the executable (or program). In another configuration, the algorithm 426 may be used to determine the sequence of clicks that produce a desired behavior of the application under test. In an additional configuration, the algorithm 426 may be applied to determine which sequence of clicks create a particular file, generate network traffic, etc.

Based on the information from these experiments, information may be added to the probability model that relates to the clicks on previous window images. In one embodiment, the click distribution model generator 428 may generate a new model of click distributions. The click distribution model may be based on the learning of a specific type of user interaction that produces the desired behavior of the application under test.

Figure 5:
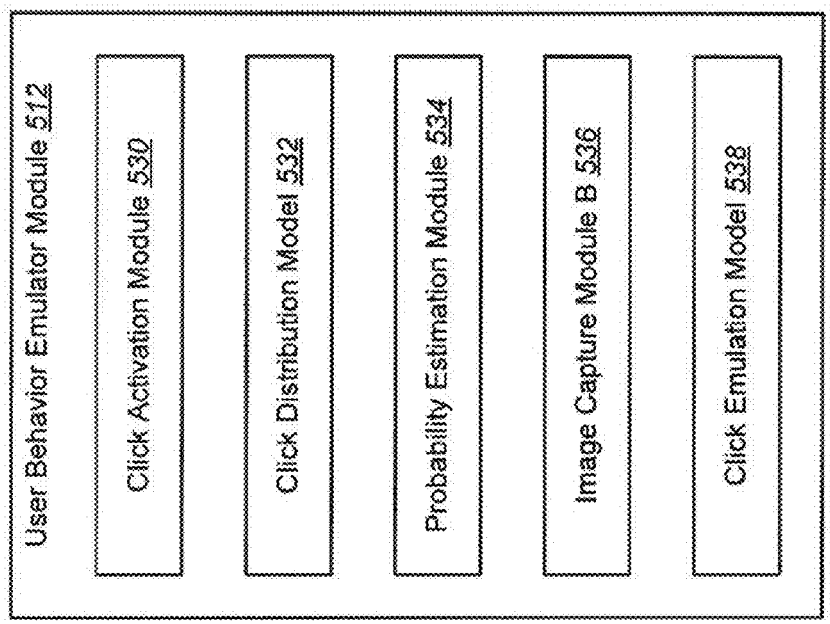
FIG. 5 is a block diagram illustrating a further embodiment of user behavior emulator module.

FIG. 5 is a block diagram illustrating a further embodiment of user behavior emulator module 512. Module 512 may use a click distribution module 532 that was generated by the reinforcement learning module 410 to emulate human behavior. In one configuration, the user behavior emulator module 512 may be used to emulate human behavior in order to analyze potentially malicious software.

In one embodiment, a click activation module 530 may execute clicks on a potentially malicious program's user interface in a controlled environment. An image capture module 536 may capture the various images of the potentially malicious program's user interface. The clicks may be executed in certain regions of the user interface by a click emulation module 538. The emulation module 538 may execute the clicks based on the click distribution model 532. For example, the click distribution model 532 may indicate the probability that a click may be executed on a certain pixel in the interface. As the clicks are executed by the click emulation module 538, the activity of the potentially malicious software may be analyzed.

In one embodiment, the user behavior emulator module 512 may also analyze the usability of a particular application. For example, while testing the usability of an application, a probability estimation module 534 may provide estimates of probabilities that an average user may click in certain regions of a user interface associated with the application that is being tested.

Figure 6:
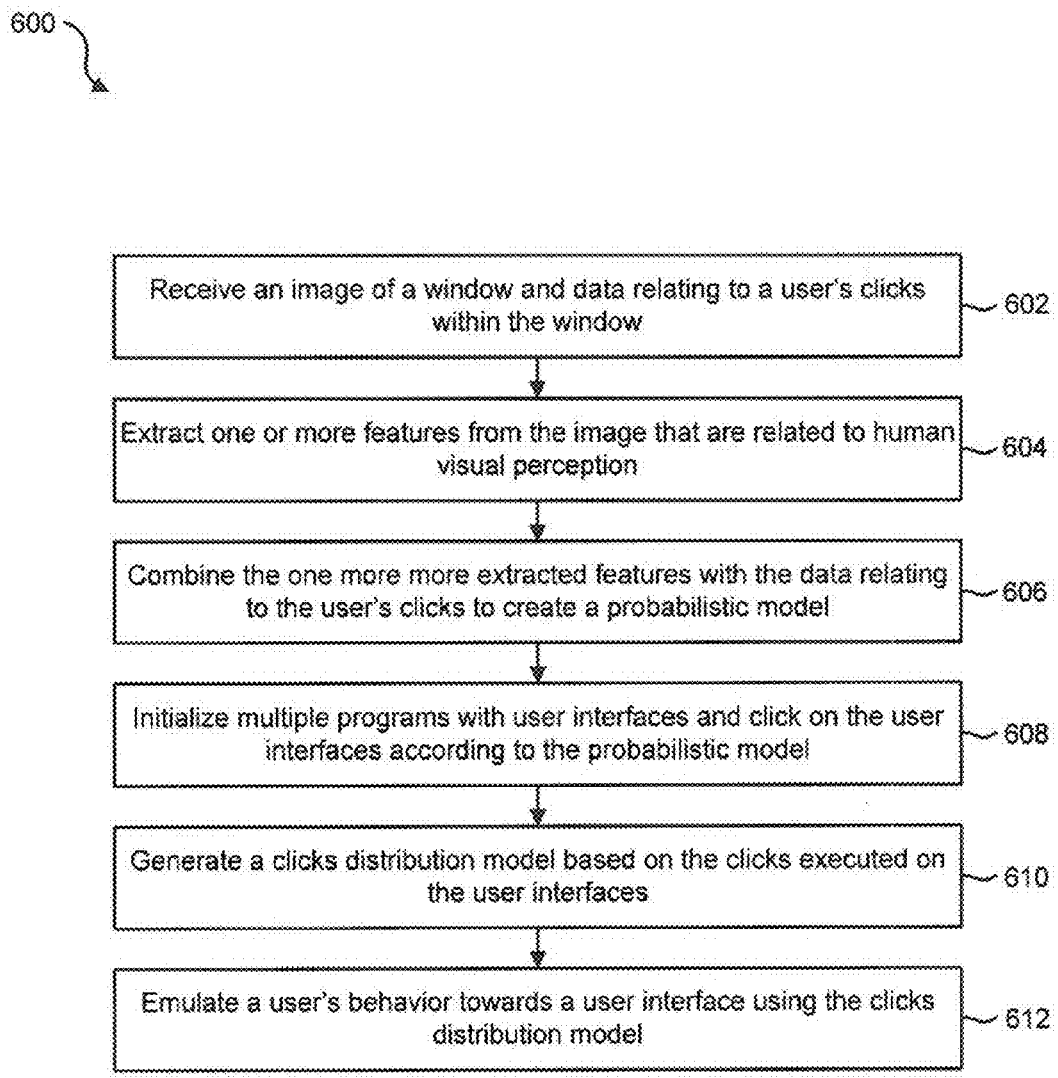
FIG. 6 is a flow diagram illustrating one embodiment of a method for emulating the behavior of a user in a computer-human interaction environment.

FIG. 6 is a flow diagram illustrating one embodiment of a method for emulating the behavior of a user in a computer-human interaction environment. In one example, the method 600 may be implemented by the emulating system 150.

In one embodiment, an image a window and data relating to the positions of clicks executed within the window may be received 602. One or more features of the image that are related to human visual perception may be extracted 604. As previously mentioned, these features may include contrast zones, various textures, contours, shapes, etc.

In one example, the one or more extracted features may be combined 606 with the data relating to the position of a user's clicks within the image of the window. The combined data may be used to create a probabilistic model. In addition, multiple programs with user interfaces may be initialized 608. Clicks may be executed in certain regions of the user interfaces associated with the multiple programs. In one embodiment, the clicks may be executed in the regions according to the probabilistic model.

In one configuration, a click distribution model may be generated 610 based on the clicks executed on the user interfaces of the multiple programs. A program to be tested may be initialized. The program may be a potentially malicious program. In another embodiment, the program may be an application that is being tested for usability. After the program is initialized, a user's behavior on the user interface of the program may be emulated 612 using the click distribution model. As the clicks are executed, the behavior of the program may be observed.

Figure 7:
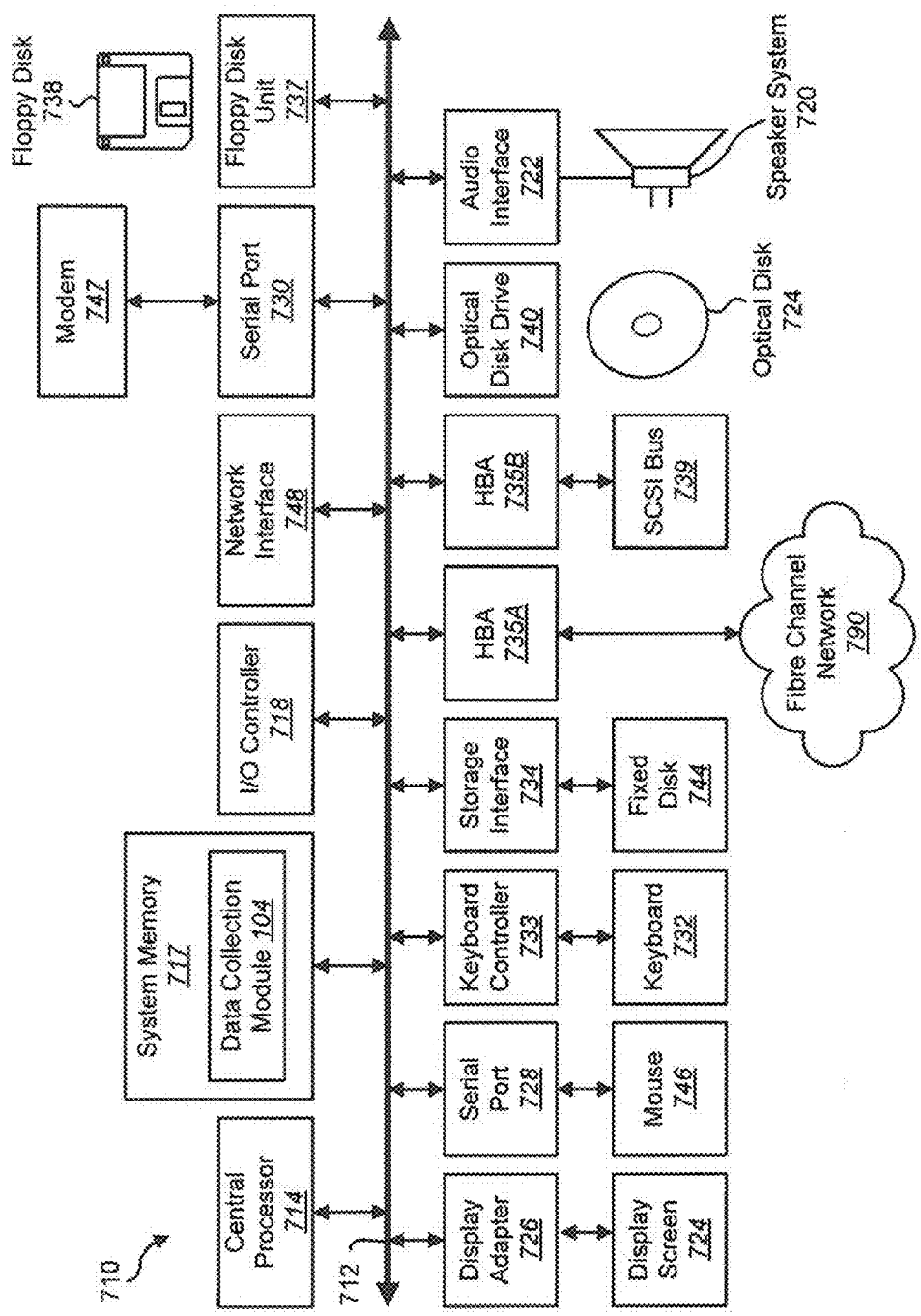
FIG. 7 depicts a block diagram of a computer system suitable for implementing the present systems and methods.

FIG. 7 depicts a block diagram of a computer system 710 suitable for implementing the present systems and methods. Computer system 710 includes a bus 712 which interconnects major subsystems of computer system 710, such as a central processor 714, a system memory 717 (typically RAM, but which may also include ROM, flash RAM, or the like), an input/output controller 718, an external audio device, such as a speaker system 720 via an audio output interface 722, an external device, such as a display screen 724 via display adapter 726, serial ports 728 and 730, a keyboard 732 (interfaced with a keyboard controller 733), a storage interface 734, a floppy disk drive 737 operative to receive a floppy disk 738, a host bus adapter (HBA) interface card 735A operative to connect with a Fibre Channel network 790, a host bus adapter (HBA) interface card 735B operative to connect to a SCSI bus 739, and an optical disk drive 740 operative to receive an optical disk 742. Also included are a mouse 746 (or other point-and-click device, coupled to bus 712 via serial port 728), a modem 747 (coupled to bus 712 via serial port 730), and a network interface 748 (coupled directly to bus 712).

Bus 712 allows data communication between central processor 714 and system memory 717, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. For example, the data collection module 104 to implement the present systems and methods may be stored within the system memory 717. Applications resident with computer system 710 are generally stored on and accessed via a computer readable medium, such as a hard disk drive (e.g., fixed disk 744), an optical drive (e.g., optical drive 740), a floppy disk unit 737, or other storage medium. Additionally, applications can be in the form of electronic signals modulated in accordance with the application and data communication technology when accessed via network modem 747 or interface 748.

Storage interface 734, as with the other storage interfaces of computer system 710, can connect to a standard computer readable medium for storage and/or retrieval of information, such as a fixed disk drive 744. Fixed disk drive 744 may be a part of computer system 710 or may be separate and accessed through other interface systems. Modem 747 may provide a direct connection to a remote server via a telephone link or to the Internet via an internet service provider (ISP). Network interface 748 may provide a direct connection to a remote server via a direct network link to the Internet via a POP (point of presence). Network interface 748 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 7 need not be present to practice the present disclosure. The devices and subsystems can be interconnected in different ways from that shown in FIG. 7. The operation of a computer system such as that shown in FIG. 7 is readily known in the art and is not discussed in detail in this application. Code to implement the present disclosure can be stored in computer-readable storage media such as one or more of system memory 717, fixed disk 744, optical disk 742, or floppy disk 738. The operating system provided on computer system 710 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 8:
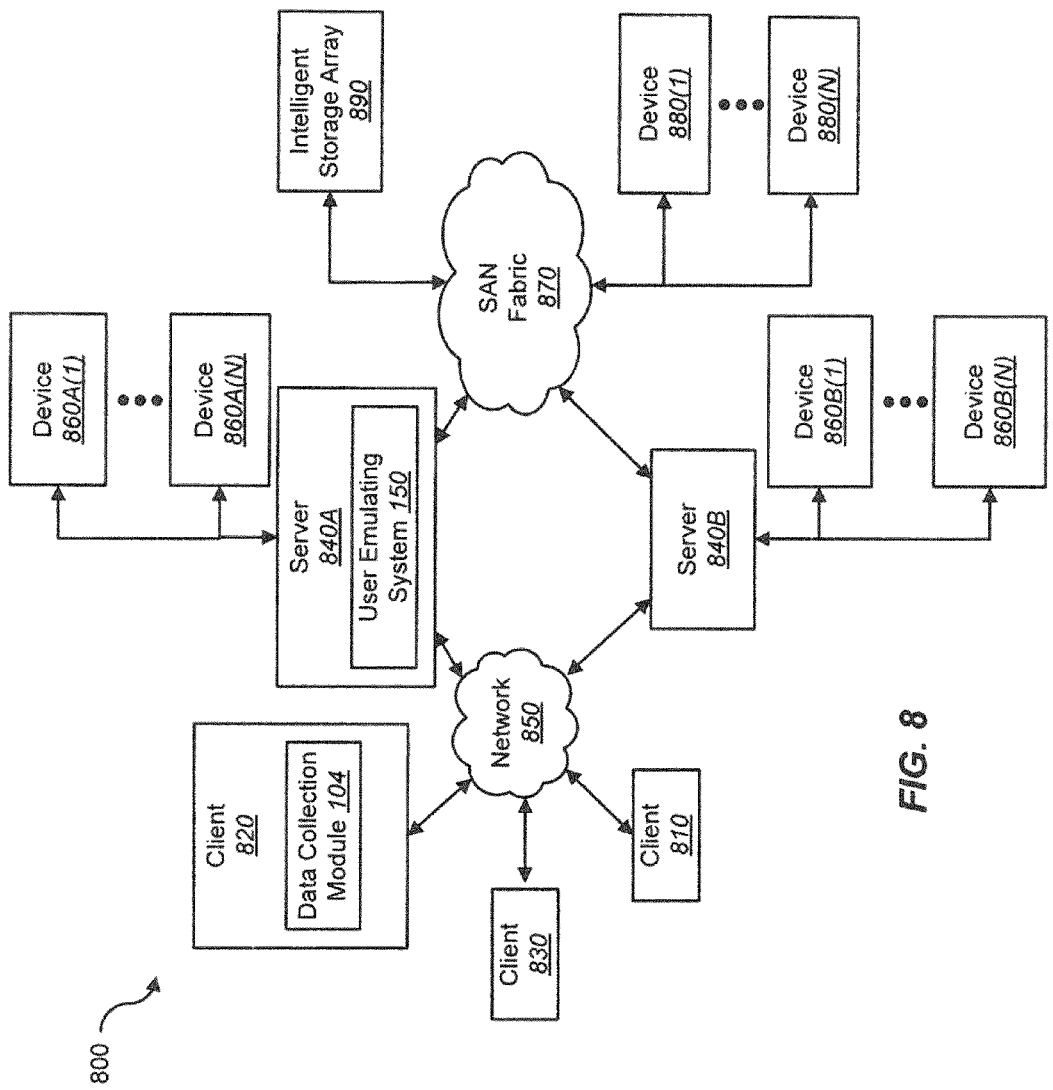
FIG. 8 is a block diagram depicting a network architecture in which client systems, as well as storage servers are coupled to a network.

FIG. 8 is a block diagram depicting a network architecture 800 in which client systems 810, 820 and 830, as well as storage servers 840A and 840B (any of which can be implemented using computer system 810), are coupled to a network 850. In one embodiment, the data collection module 104 to implement the present systems and methods may be located within a client system 810, 820, 830. In addition, the emulating system 150 may be located within a server 840A, 840B to implement the present systems and methods. The storage server 840A is further depicted as having storage devices 860A(1)-(N) directly attached, and storage server 840B is depicted with storage devices 860B(1)-(N) directly attached. Storage servers 840A and 840B are also connected to a SAN fabric 870, although connection to a storage area network is not required for operation of the disclosure. SAN fabric 870 supports access to storage devices 880(1)-(N) by storage servers 1040A and 840B, and so by client systems 810, 820 and 830 via network 850. Intelligent storage array 890 is also shown as an example of a specific storage device accessible via SAN fabric 870.

With reference to computer system 710, modem 747, network interface 748 or some other method can be used to provide connectivity from each of client computer systems 810, 820 and 830 to network 850. Client systems 810, 820 and 830 are able to access information on storage server 840A or 840B using, for example, a web browser or other client software (not shown). Such a client allows client systems 810, 820 and 830 to access data hosted by storage server 840A or 840B or one of storage devices 860A(1)-(N), 860B(1)-(N), 880(1)-(N) or intelligent storage array 890. FIG. 8 depicts the use of a network such as the Internet for exchanging data, but the present disclosure is not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for emulating the behavior of a user in a computer-human interaction environment, comprising:
   receiving an image of a window and data relating to positions of clicks executed within the image;
   extracting one or more features from the image related to human visual perception;
   combining the one or more extracted features with the data relating to the positions of the clicks executed within the image;
   creating a probabilistic model from the combination to estimate a probability of a click being executed in a region of a window;
   executing clicks, in accordance with the probabilistic model, within windows associated with a plurality of applications;
   creating a probability distribution model based on the position of the clicks executed within the windows of the plurality of applications; and executing clicks, in accordance with the probability distribution model, within a window associated with an application being tested.

2. The method of claim 1, wherein the one or more windows comprise a user interface.

3. The method of claim 1, further comprising applying a reinforcement learning algorithm to process data collected from the application and the probabilistic model to produce a second probabilistic model, wherein the second model incorporates initial information regarding images, sequences of clicks, and the behavior of the application.

4. The method of claim 3, wherein the sequence of clicks maintain the execution of the application for a specified length of time.

5. The method of claim 3, wherein the sequence of clicks cause a predetermined activity from the application.

6. The method of claim 3, wherein the sequence of clicks executed within the window of the application create a specified file.

7. The method of claim 1, wherein the application being tested is a potentially malicious application.

8. The method of claim 1, wherein the extracted features of the image comprise contrast zones, textures, contours, or shapes within the image.

9. A computer system configured to emulate the behavior of a user in a computer-human interaction environment, comprising:
   a processor;
   memory in electronic communication with the processor
   instructions stored in the memory, the instructions being executable by the processor to:
      receive an image of a window and data relating to positions of clicks executed within the image;
      extract one or more features from the image related to human visual perception;
      combine the one or more extracted features with the data relating to the positions of the clicks executed within the image;
      create a probabilistic model from the combination to estimate a probability of a click being executed in a region of a window;
      execute clicks, in accordance with the probabilistic model, within windows associated with a plurality of applications;
      create a probability distribution model based on the position of the clicks executed within the windows of the plurality of applications; and
      execute clicks, in accordance with the probability distribution model, within a window associated with an application being tested.

10. The computer system of claim 9, wherein the one or more windows comprise a user interface.

11. The computer system of claim 9, wherein the processor is further configured to apply a reinforcement learning algorithm to process data collected from the application and the probabilistic model to produce a second probabilistic model, wherein the second model incorporates initial information regarding images, sequences of clicks, and the behavior of the application.

12. The computer system of claim 11, wherein the sequence of clicks maintain the execution of the application for a specified length of time.

13. The computer system of claim 11, wherein the sequence of clicks cause a predetermined activity from the application.

14. The computer system of claim 11, wherein the sequence of clicks within the window of the application create a specified file.

15. The computer system of claim 9, wherein the application being tested is a potentially malicious application.

16. A computer-program product for emulating the behavior of a user in a computer-human interaction environment, the computer-program product comprising a non-transitory computer-readable medium having instructions thereon, the instructions being executable by a processor to:
   receive an image of a window and data relating to positions of clicks executed within the image;
   extract one or more features from the image related to human visual perception;
   combine the one or more extracted features with the data relating to the positions of the clicks executed within the image;
   create a probabilistic model from the combination to estimate a probability of a click being executed in a region of a window;
   execute clicks, in accordance with the probabilistic model, within windows associated with a plurality of applications;
   create a probability distribution model based on the position of the clicks executed within the windows of the plurality of applications; and
   execute clicks, in accordance with the probability distribution model, within a window associated with an application being tested.

* * * * *